(No Model.) 2 Sheets—Sheet 2.
W. C. BUCKLIN.
REGENERATIVE GAS LAMP.
No. 422,567. Patented Mar. 4, 1890.
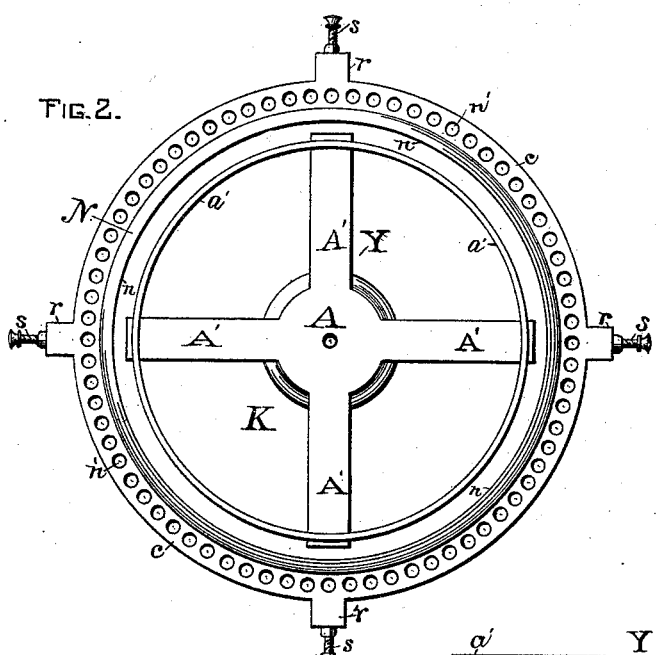
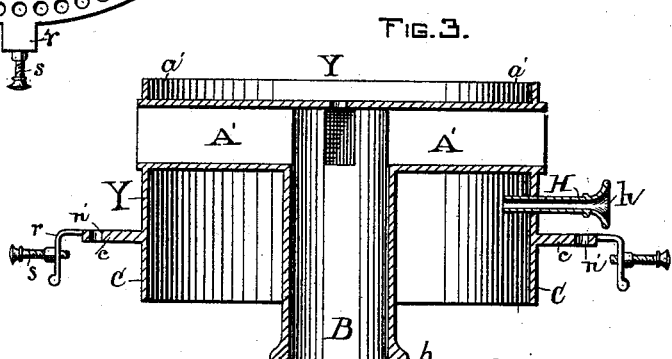
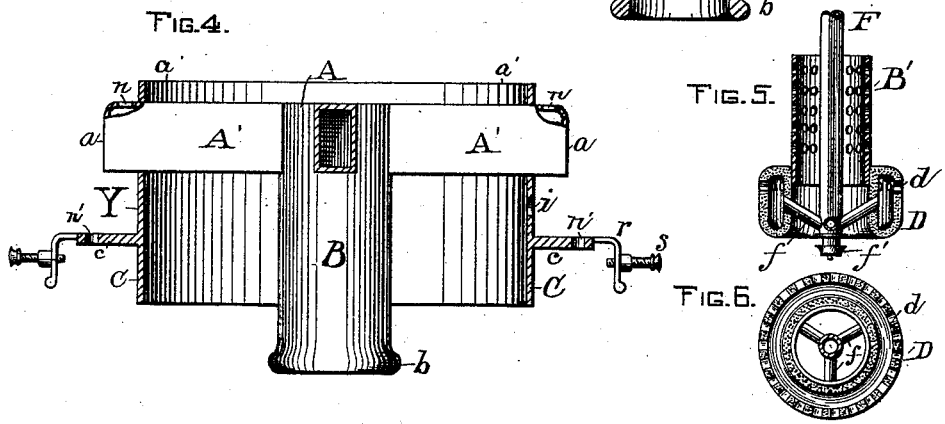
Witnesses:
Geo. G. Penney
Whet Norton
Inventor:
Wm. C. Bucklin
By E. B. Clark,
Atty.

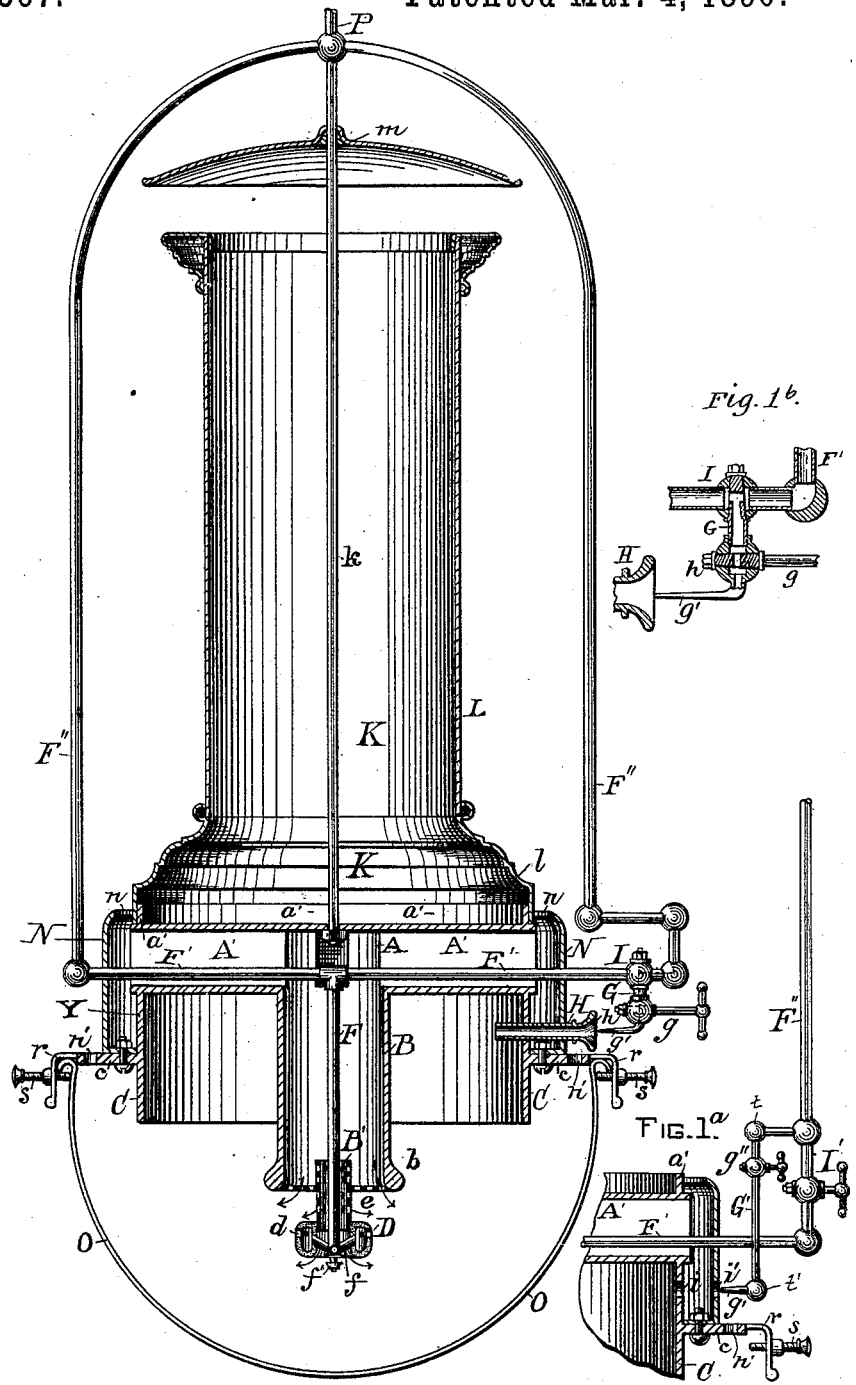

UNITED STATES PATENT OFFICE.

WILLIAM COMSTOCK BUCKLIN, OF NEW YORK, N. Y.

REGENERATIVE GAS-LAMP.

SPECIFICATION forming part of Letters Patent No. 422,567, dated March 4, 1890.

Application filed September 25, 1888. Serial No. 286,342. (No model.)

*To all whom it may concern:*

Be it known that I, WILLIAM COMSTOCK BUCKLIN, a citizen of the United States, residing at New York city, in the county of New York and State of New York, have invented certain new and useful Improvements in Regenerative Gas-Lamps; and I do hereby declare the following to be a full, clear, and exact description of the invention, such as will enable others skilled in the art to which it appertains to make and use the same.

This invention relates to regenerative gas-lamps in which air for supporting combustion of gas at the burner is heated by the hot products of combustion escaping from the burner-flame and passing up the chimney of the lamp.

The object of the invention is to simplify the construction of the lamp by reducing the number of parts and thus lessening the expense; also, to provide an efficient lighting device which can be operated from the outside of the lamp and need be used only for a moment at the time of lighting the lamp, thus economizing gas and much simplifying the operation of lighting the main burner of the lamp; also, to do away with the usual metal globe-ring and its hinge and fastening device, since an external lighting device is used and the globe need not be removed for lighting the gas at the burner, whereby the construction is further simplified and the cost reduced.

Another object is to do away with the deflecting-button or flame-spreader ordinarily used in this class of lamps, and to provide for causing the gas to issue horizontally from the periphery or circumferential portion of the burner-head, so that the flame will spread out horizontally and curve upward from the lower thickened or curved end of the flame-sleeve.

I have cast in one piece the heating-chamber, flame-sleeve, reflector, rim for containing the small air-holes, and lugs for screws to hold the globe, thereby greatly lessening the number of parts and the necessary fittings, and means for securing the parts together as ordinarily constructed. I also provide small flame-openings in the walls of the lamp above the globe, and arrange a small jet-nozzle to point into the openings and connect by a small valved pipe or passage with the main gas-pipe of the lamp for projecting a lighting-jet into the lamp. A tube having at its outer end a flaring or trumpet-shaped mouth may be set into the openings for ornamental effect. This tube should project a short distance into the interior of the lamp above the burner, and at its bell-mouthed outer end is arranged the jet-nozzle above mentioned. By means of this jet-nozzle a small flame is shot through the tube whenever it is desired to light the lamp. The lamp having been lighted, the supply of gas to the jet-nozzle is shut off and its flame extinguished. I also provide a swinging or turning jet-nozzle, extending from the valve-plug in the main gas-supply pipe, said plug having a small longitudinal passage leading from the pipe to the nozzle, and the handle of the valve-plug having a small hole through it to register with such passage and admit gas to the jet-nozzle.

The parts and combination of parts constituting my invention will first be specifically described with reference to the drawings, and then defined in the claims.

In the accompanying drawings, Figure 1 represents a vertical section of a regenerative gas-lamp, showing my improvements applied. Figs. 1ᵃ and 1ᵇ represent detail views of my lighting device. Fig. 2 represents a top plan view of the heating-chamber casting. Fig. 3 represents a vertical section thereof. Fig. 4 represents the heating-chamber in elevation and in slightly-modified form. Fig. 5 represents a detail view of the burner-head in vertical section, and Fig. 6 represents a horizontal section thereof.

The principal parts of my improved lamp are embodied in a single metallic, earthenware, or other casting Y, composed of the heating-chamber A, having four or more radial arms A′ extending from its central portion outward to the exterior of the lamp and slightly beyond vertical flange a′, cylindrical reflector C, projecting down from the arms, horizontal rim or flange e, projecting outward from the cylindrical portion C, and the lugs r, projecting outward and turning downward from the flange c, the latter to receive the screws s to support the globe. The whole supports the ornamental base l of chimney L, as shown in Fig. 1. The radial arms A' may extend beyond the cylinder C of the casting, so as to form receiving-chambers $a$, having air-inlet openings $n$ in their tops, as shown in Fig. 4. Six radial arms A' may be used instead of four, as shown, if desired.

A band N, which may be of any desired ornamental design, is applied around the lamp and supported upon the horizontal rim or flange $c$, to which it may be secured by screws. This band forms an annular air-chamber, which has an annular opening $n$ at the top for admission of air to the open ends of arms A'. It serves as a guard to the arms to prevent air from being drawn or blown into them too violently.

A short vertical rim or flange $a'$ extends upward from the arms A' for attaching the ornamental base $l$ of the chimney L. A cylindrical reflector C projects downward from the arms A', forming the lower portion of the chimney-flue K, and serves to direct the products of combustion from the burner up into the chimney. A horizontal rim or flange $c$ projects outward from the cylindrical portion C, and is provided with a series of holes $n'$ for the admission of air all around the inside of the globe. Lugs $r$ project outward and are turned downward from the rim $c$, and are provided with screw-holes for receiving the screws $s$, which support the globe.

The flame-sleeve B extends downward from the central air-heating chamber A, and is provided at the bottom with a rounded thickened lip $b$. A short distance below the mouth of the flame-sleeve is centrally located the burner-head D, so as to leave an annular opening between the two. The burner-head is connected by small radial tubes $f$ with the vertical gas-supply pipe F, extending through the sleeve B. The pipe F connects with two horizontal pipes F', which pass through the arms A' of the heating-chamber, and connect outside the lamp with the vertical supply-pipes F'', connecting at the top with the house service-pipe P. A hollow nut $f'$ is applied to the lower end of pipe F, for catching any dirt or moisture that may be present in the gas and prevent it from clogging the burner-holes. An interior perforated air-tube B' extends from the top of the annular burner-head a short distance up into the sleeve B, and is open at the top for the passage of air down through the burner-head D. An annular sheet of wire-gauze or perforated metal $e$ is secured between the tube B' and the lip $b$ of the flame-sleeve B, and a plate of similar perforated material may also be inserted within the annular burner-head for moderating and distributing the flow of air.

By means of the construction shown air is supplied in fine streams or jets to the flame, issuing from the burner-head D in three directions—viz., downward through perforated plate $e$, horizontally through perforated tube B', and down through the opening of the annular burner-head and up around its lower end to the outside of the flame—resulting in better combustion of the gas and a more brilliant light than usually obtainable. A rod $k$ extends down from the service-pipe P through the chimney L, and is secured by a nut to the top of the heating-chamber A to assist in supporting such chamber. The chamber and its connected parts are also supported by the gas-pipes F' and F''. A hole $i$ is formed in the wall of the cylindrical reflector above the rim $c$, and a similar hole $i'$ is made in band N in line with hole $i$, as shown in Fig. 1$^a$, for passage of the jet-flame of the lighting device. The lighting-jet may be readily shot through these holes from jet-nozzle $g'$ for lighting the lamp; but for giving a more finished and ornamental appearance I sometimes secure a tube H in the holes. It is provided at its outer end with a bell-mouth $h$, and is so arranged as to project at its inner end a short distance inside of cylinder C. The jet-nozzle $g'$ of the lighting device is so arranged as to point into the holes or into the tube.

In the swinging or turning lighter shown in Figs. 1 and 1$^b$ the valve I in the main gas-supply pipe F' is provided with an extended plug G, having a small longitudinal passage leading from pipe F' to jet-nozzle $g'$, and the handle $g$ of the plug has a small hole through it arranged to register with such passage, so that by turning the handle gas is supplied to the jet-nozzle to be lighted. When it is desired to light the lamp, handle $g$ is turned so as to admit gas to the jet-nozzle, where it is lighted. Then plug G is turned by the handle so as to open valve I, admitting gas to the lamp-burner, and at the same time swing nozzle $g'$ into position to point into openings $i$ $i'$ or flame-tube H. As gas escapes from the burner-head D it is instantly ignited by the lighting-jet, after which such jet may be extinguished.

In the lighting device shown in Fig. 1$^a$ the small pipe G', having a separate key or valve $g''$, connects with the main gas-supply pipe above its valve I' and terminates at its lower end in the jet-nozzle $g'$. In this form of lighter the jet is first lighted and forced by the pressure of the gas through holes $i$ $i'$. Then valve I' is opened, admitting gas to the burner, where it is ignited. Pipe G' may be provided with turning joints at either $t$ or $t'$, similar to the turning joint used in the construction shown in Figs. 1 and 1$^b$, so that the jet-nozzle $g'$ can be turned to or from the opening $i$ $i'$. I preferably use a turning jet-nozzle like one of the forms above described. A smoke bell or hood $m$ is attached to the rod K, a short distance above the top of the chimney, for deflecting the smoke or hot air in the usual manner. The globe O is held in position against the edge of the flange or rim $c$ by screws $s$, projecting through lugs $r$, no hinged ring or fastening device therefor being required.

The casting Y, comprising the air-heater, the flame-sleeve, the cylindrical reflector, and a horizontal outwardly-extending rim containing air-inlet holes, is clearly represented in Fig. 3, showing a vertical section, and in Fig. 4 partly in elevation and partly in section. This form of casting, comprising the parts mentioned, greatly lessens the expense of construction and of fitting the parts together as usually made. The lamp is thus made simpler and is less liable to get out of order. It can also be much more readily operated and controlled by unskillful persons.

Since an external lighting device such as above described is used, it is unnecessary to provide a hinged ring for the globe, as it need not be removed for lighting the gas at the burner, thus again lessening the expense of construction and avoiding the danger of breaking the globe when the lamp is lighted.

The operation of lighting the lamp is very simple, and can be very quickly and safely performed by any unskilled person. It is no more difficult than lighting an ordinary gas-tip.

Having described my invention, I claim, and desire to secure by Letters Patent, as follows:

1. In a gas-lamp, the combination of the air-heating chamber, consisting of the radial arms, the depending flame-sleeve, and the cylindrical reflector, formed in one piece, with the gas-pipe extending through two of the arms and through the flame-sleeve, as and for the purpose described.

2. In a gas-lamp, the combination of the air-heating chamber, consisting of the radial arms, with the depending flame-sleeve and the cylindrical reflector, provided with a horizontal perforated flange, said flange being provided with downwardly-turned lugs having screw-threaded openings for the globe-retaining screws, as and for the purpose described.

3. In combination with the flame-sleeve of a gas-lamp provided with a perforated plate at its mouth, the annular burner-head placed centrally near its mouth, said burner-head having perforations passing horizontally through its circumferential wall, the perforated air-tube connecting with the inner wall of the burner-head and extending up through the perforated plate into the flame-sleeve, for the purpose described.

4. The combination, with a gas-lamp having holes through its air-chamber and reflector-walls, of an external movable lighting device connected to the supply-pipe and capable of being turned to be ignited and then moved to point into the holes in the walls, as described.

5. In combination with a gas-lamp, a swinging or turning jet-nozzle connecting with the plug of valve in the main gas-supply pipe and arranged in proper position to be turned and made to project a flame into an opening in the wall of the lamp, whereby the latter may be readily lighted when desired, as described.

6. In combination with a gas-lamp having an opening in its wall, an external swinging lighting device, consisting of a valve in the main gas-supply pipe, the turning plug thereof having an extension provided with a passage, a jet-nozzle connected with the plug, and the handle of the plug having a hole to register with such passage, whereby the jet-nozzle may first be lighted, and then by turning such nozzle in position to project its jet-flame through the opening into the lamp the valve is opened, admitting gas to the burner of the lamp and causing its instant ignition, as described.

In testimony whereof I affix my signature in presence of two witnesses.

WILLIAM COMSTOCK BUCKLIN.

Witnesses:
FREDERICK W. GAUTRY,
GEORGE R. YOUNG.